United States Patent
Druml et al.

(10) Patent No.: US 10,877,264 B2
(45) Date of Patent: Dec. 29, 2020

(54) ADAPTIVE AND CONTEXT-AWARE MICRO-ELECTRO-MECHANICAL SYSTEMS (MEMS) MIRROR CONTROL

(71) Applicant: Infineon Technologies AG, Neubiberg (DE)

(72) Inventors: Norbert Druml, Graz (AT); Philipp Greiner, Graz (AT); Ievgeniia Maksymova, Graz (AT)

(73) Assignee: Infineon Technologies AG, Neubiberg (DE)

(*) Notice: Subject to any disclaimer, the term of this patent is extended or adjusted under 35 U.S.C. 154(b) by 151 days.

(21) Appl. No.: 16/196,786

(22) Filed: Nov. 20, 2018

(65) Prior Publication Data
US 2020/0159005 A1     May 21, 2020

(51) Int. Cl.
```
G02B 26/08     (2006.01)
G02B 26/10     (2006.01)
G01S 7/497     (2006.01)
G01S 7/484     (2006.01)
G01S 7/481     (2006.01)
```

(52) U.S. Cl.
CPC .......... *G02B 26/0833* (2013.01); *G01S 7/484* (2013.01); *G01S 7/4817* (2013.01); *G01S 7/497* (2013.01); *G02B 26/105* (2013.01)

(58) Field of Classification Search
None
See application file for complete search history.

(56) References Cited

U.S. PATENT DOCUMENTS

| | | | | |
|---|---|---|---|---|
| 4,686,363 A * | 8/1987 | Schoon | ................ | H04N 1/053 250/235 |
| 6,400,384 B1 * | 6/2002 | Kuwabara | .......... | G06K 15/1204 347/129 |
| 7,796,314 B2 * | 9/2010 | Sutko | ................ | G02B 21/0048 359/198.1 |
| 7,907,019 B1 * | 3/2011 | Brown | ................ | G02B 26/085 331/1 A |
| 8,669,926 B2 * | 3/2014 | Mignard | .............. | G02B 26/001 345/108 |
| 8,752,969 B1 * | 6/2014 | Kane | .................... | G02B 7/1821 359/872 |
| 9,905,992 B1 * | 2/2018 | Welford | ................. | G01S 17/42 |
| 2002/0122217 A1 * | 9/2002 | Nakajima | .......... | G02B 26/0841 358/505 |
| 2007/0035799 A1 * | 2/2007 | Gomi | ................... | G02B 26/105 359/213.1 |

(Continued)

*Primary Examiner* — Jennifer D. Carruth
(74) *Attorney, Agent, or Firm* — Harrity & Harrity, LLP

(57) ABSTRACT

A system may include a micro-electro-mechanical systems (MEMS) mirror and a MEMS driver circuit. The MEMS driver circuit may obtain a plurality of items of monitoring information associated with the MEMS mirror. The plurality of items of monitoring information may include at least one of sensor information received from one or more sensors associated with the MEMS mirror, or operation information received from a controller associated with the system. The MEMS driver circuit may determine a state of the MEMS mirror based on the plurality of items of monitoring information. The MEMS driver circuit may adapt a mirror control parameter, associated with controlling the MEMS mirror, based on the state of the MEMS mirror.

20 Claims, 6 Drawing Sheets

(56) References Cited

U.S. PATENT DOCUMENTS

| | | | |
|---|---|---|---|
| 2009/0323149 A1* | 12/2009 | Mizukami | G02B 26/0841 |
| | | | 359/221.2 |
| 2010/0254019 A1* | 10/2010 | Cui | G01S 13/867 |
| | | | 359/633 |
| 2018/0113200 A1* | 4/2018 | Steinberg | G01S 7/4861 |
| 2018/0120436 A1* | 5/2018 | Smits | G01S 17/86 |
| 2018/0164579 A1* | 6/2018 | Haran | G02B 26/105 |

\* cited by examiner

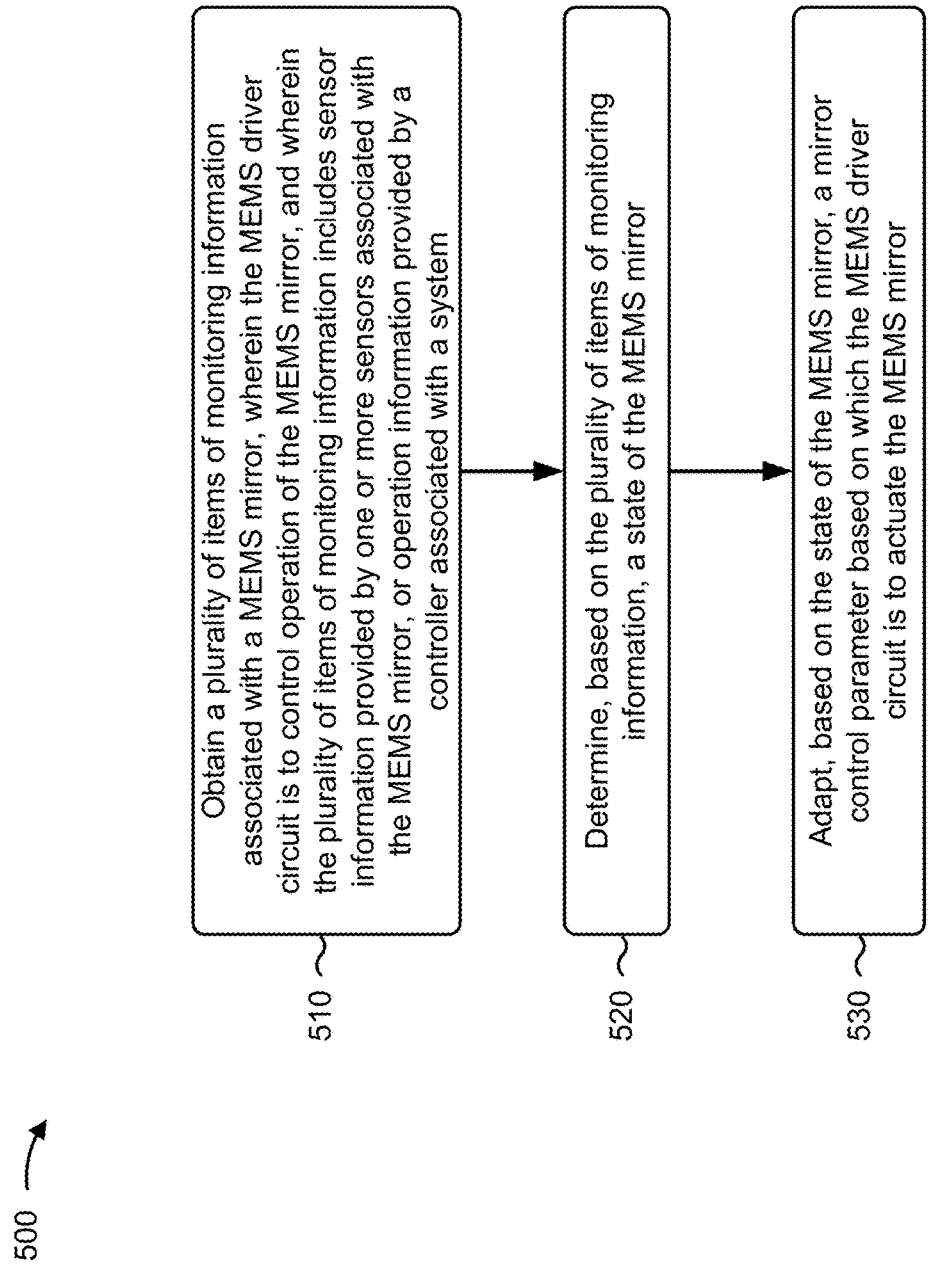

ADAPTIVE AND CONTEXT-AWARE MICRO-ELECTRO-MECHANICAL SYSTEMS (MEMS) MIRROR CONTROL

BACKGROUND

A micro-electro-mechanical systems (MEMS) mirror is a device that can be used to direct light (e.g., a laser beam) in a number of applications, such as a LiDAR application, a sensing application, an optical communications application, and/or the like. In operation, the MEMS mirror may move (e.g., tilt about one or more axes) in order to change a direction in which the light is directed by the MEMS mirror. Actuation, control, and position sensing of the MEMS mirror is performed by a MEMS driver circuit.

SUMMARY

According to some possible implementations, a system may include a MEMS mirror; and a MEMS driver circuit to: obtain a plurality of items of monitoring information associated with the MEMS mirror, wherein the plurality of items of monitoring information includes at least one of: sensor information received from one or more sensors associated with the MEMS mirror, or operation information received from a controller associated with the system; determine a state of the MEMS mirror based on the plurality of items of monitoring information; and adapt a mirror control parameter, associated with controlling the MEMS mirror, based on the state of the MEMS mirror.

According to some possible implementations, a method may include obtaining, by a MEMS driver circuit, a plurality of items of monitoring information associated with a MEMS mirror, wherein the MEMS driver circuit is to control operation of the MEMS mirror, and wherein the plurality of items of monitoring information includes: sensor information provided by one or more sensors associated with the MEMS mirror, or operation information provided by a controller associated with a system; determining, by the MEMS driver circuit and based on the plurality of items of monitoring information, a state of the MEMS mirror; and adapting, by the MEMS driver circuit and based on the state of the MEMS mirror, a mirror control parameter based on which the MEMS driver circuit is to actuate the MEMS mirror.

According to some possible implementations, a LiDAR system may include: a MEMS mirror; and a MEMS driver circuit to obtain a plurality of items of monitoring information, associated with the MEMS mirror, that includes: sensor information provided by one or more sensors associated with the MEMS mirror, or operation information provided by a controller associated with the LiDAR system; determine a state of the MEMS mirror based on the plurality of items of monitoring information; adapt a mirror control parameter, associated with the MEMS mirror, based on the state of the MMI; and control the MEMS mirror based on the adapted mirror control parameter. In embodiments, a plurality of items of monitoring information includes at least two information items of different category (e.g., from sensors measuring different parameters or from a sensor and from a request to modify operation of the MEMS mirror). For example a plurality of items of monitoring information may include a first item of information resulting from measurement signals of a first sensor type (e.g., a temperature sensor) and second item of information resulting from measurement signals of a second sensor type (e.g., a pressure sensor). As another example, the plurality of items of monitoring information may include, for example, a first item of information resulting from measurements signals of a sensor (e.g., a temperature or a pressure sensor) and a second item of information resulting from an external request (e.g., from a controller) to modify operation of the MEMS mirror (e.g., a request to modify an accuracy requirement or a range of view).

BRIEF DESCRIPTION OF THE DRAWINGS

FIG. 5 is a flow chart of an example process for of adapting a mirror control parameter, associated with a MEMS mirror, based on a state of the MEMS mirror, as described herein.

DETAILED DESCRIPTION

Figure 1:
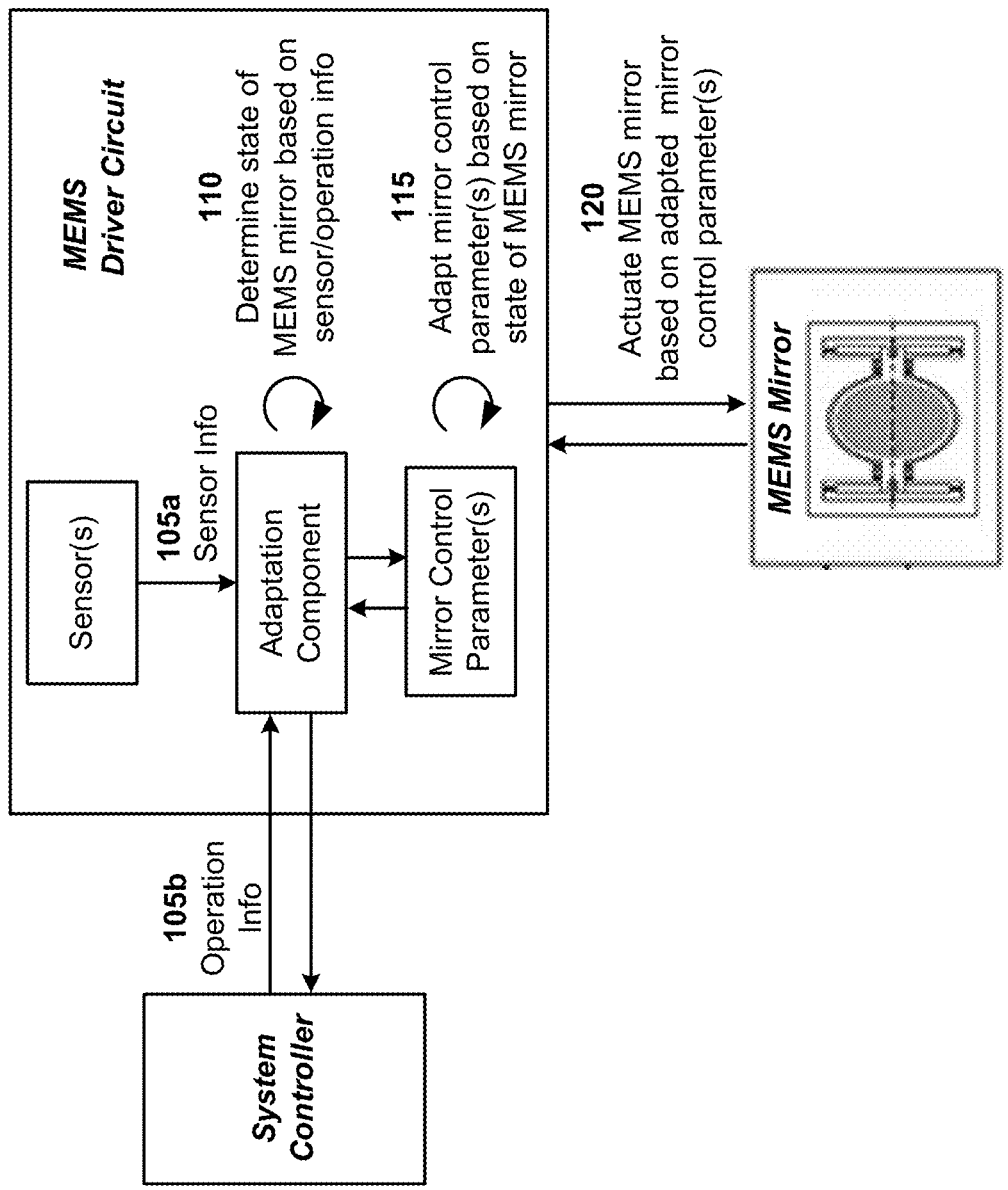
FIG. 1 is a diagram of an example implementation of adapting a mirror control parameter, associated with a MEMS mirror, based on a state of the MEMS mirror, as described herein.

The following detailed description of example implementations refers to the accompanying drawings. The same reference numbers in different drawings may identify the same or similar elements.

A MEMS mirror may be capable tilting about one or more axes in association with directing light. For example, in the case of a LiDAR system, light (e.g., emitted by one or more lasers) is directed to the MEMS mirror, and the MEMS mirror directs the light toward scenery about which information (e.g., a distance measurement, a 3D image, and/or the like) is to be ascertained by the LiDAR system. Here, a position (e.g., a tilt angle) of the MEMS mirror may be controlled such that the MEMS mirror oscillates about an axis (e.g., from left to right to left, and so on), while directing light toward the scenery (e.g., such that the light scans back and forth across the scenery in a horizontal direction). Light reflected by the scenery is received (e.g., via receiving optics) by an array of photo diodes included in the LiDAR system. Output signals (e.g., one or more signals corresponding to the received light) provided by the photodiode array can be used by a system controller of the LiDAR system in order to determine (e.g., based on an amount of time between a time at which the light was emitted and a time at which the light is received) a distance to the scenery. Such information can be used for distance measurement, 3D imaging, and/or the like.

In operation of a system including a MEMS mirror, a MEMS driver circuit (e.g., a MEMS driver application specific integrated circuit (ASIC)) actuates the MEMS mirror and also senses the position of the MEMS mirror. During operation, as the MEMS mirror oscillates, the MEMS driver circuit determines and provides information that identifies the position of the MEMS mirror at a given time (e.g., information that identifies a tilt angle of the MEMS mirror at a given time) to a system controller. Based on this positional information, the system controller triggers the one or more light sources to emit light. Thus, system accuracy (i.e., accuracy of the optical sensing application) is dependent not only on the actuation of the MEMS mirror by the MEMS driver circuit, but also on the accuracy of the positional information provided by the MEMS driver circuit.

A given set of environmental conditions (e.g., a high temperature, acceleration, mechanical shock, electromagnetic interference (EMI), and/or the like) and/or operational conditions (e.g., changing from a first maximum angle to a second maximum angle) can impair performance and accuracy of the MEMS mirror actuation and position sensing by the MEMS driver circuit. Conventionally, the MEMS driver circuit uses static mirror control parameters in association with controlling the MEMS mirror. However, the use of such static mirror control parameters are not well suited to deal with adverse and/or changing environmental conditions and/or operational conditions, as static mirror control parameters do not allow the MEMS driver circuit to adapt to adverse and/or changing conditions.

Some implementations described herein provide for adaptive and context aware MEMS mirror control. Rather than controlling the operation of the MEMS mirror based on one parameter (e.g., a temperature), embodiments described herein provide a context-based control in which multiple parameters (of different categories) are included in order to determine a state under which the MEMS mirror operates or will be operating in order to find optimal parameters for the operation of the MEMS mirror under the determined and/or intended context. The number of parameters may, in some embodiments, include at least two. In some embodiments, more than two (e.g., five or more of parameters) can be included for the context based control. Rather than optimizing the MEMS mirror operation based on a first parameter and, thereafter, based on a second parameter, the context-based control takes multiple parameters in parallel altogether into account (e.g., as a set of input parameters to a functional model for the MEMS mirror). The context-based control may allow the MEMS mirror to be operated with at least one (or even all) of the parameters being individually not optimized in view of trade-offs to be made in order to achieve an operation of the MEMS mirror optimized on the context-level. In some implementations, a MEMS driver circuit may adapt a mirror control parameter, associated with actuating a MEMS mirror, based on a state of the MEMS mirror (e.g., a set of conditions in which the MEMS mirror is operating). In some implementations, the state of the MEMS mirror may be determined based on sensor information associated with the MEMS mirror and/or operation information associated with the MEMS mirror. As such, the MEMS driver circuit may use adaptable (i.e., dynamic) mirror control parameters in association with controlling the MEMS mirror, thereby allowing adverse and/or changing environmental conditions and operational conditions to be accounted for. As a result, accuracy in both actuation and position sensing of the MEMS mirror are improved, thereby improving overall system accuracy and performance. Additional details regarding the above described aspects are provided below.

FIG. 1 is a diagram of an example implementation of adapting a mirror control parameter, associated with a MEMS mirror, based on a state of the MEMS mirror, as described herein. As shown in FIG. 1, a system (e.g., a LiDAR system) may include a system controller, a MEMS mirror, and a MEMS driver circuit. As shown, the MEMS driver circuit may be include one or more sensors (e.g., one or more components to sense and/or identify one or more conditions associated with the MEMS mirror), one or more mirror control parameter components (e.g., one or more components associated with applying one or more control parameters associated with actuating the MEMS mirror), and an adaptation component (e.g., one or more components associated with adapting the one or more mirror control parameters).

As shown by reference numbers 105a and 105b, the MEMS driver circuit (e.g., the adaptation component) may obtain sensor information and/or operation information (herein collectively referred to as monitoring information) associated with the MEMS mirror. The monitoring information may include a plurality of items of information based on which the MEMS driver circuit can determine a state of the MEMS mirror in association with adapting a mirror control parameter, as described below.

In some implementations, the sensor information can include information associated with a condition (e.g., an environmental condition) at or near the MEMS mirror or a condition of the MEMS mirror itself. For example, the sensor information may include information that identifies a temperature at or near the MEMS mirror. As another example, the sensor information may include information that identifies an amount of acceleration at or near the MEMS mirror. As another example, the sensor information may include information that identifies an amount of electromagnetic interference (EMI) at or near the MEMS mirror. As another example, the sensor information may include information that identifies an amount of pressure at or near the MEMS mirror. As another example, the sensor information may include information associated with a vibration or a shock experienced by the MEMS mirror. As another example, the sensor information may include information relating to a current associated with driving the MEMS mirror or obtaining a position characteristic of the MEMS mirror (e.g., whether a ripple is present in the current, an amount of the current, and/or the like). As another example, the sensor information may include information associated with an aging effect experienced by the MEMS mirror (e.g., information indicating that an aging effect has been detected). As another example, the sensor information may include information associated with an electrical discharge in the MEMS mirror (e.g., information indicating that an electrical discharge has been detected, an amount of the electrical discharge, and/or the like). As another example, the sensor information may include information associated with detection of a fault associated with the MEMS mirror (e.g., information indicating that a fault has been detected, information identifying the fault, and/or the like). As another example, the sensor information may include information indicating the presence of harmonics in the MEMS mirror. The above described examples of types of sensor information are non-limiting, and the MEMS driver circuit may obtain one or more other types of sensor information, in some cases.

In some implementations, the MEMS driver circuit may obtain the sensor information from one or more sensors. In some implementations, a given one of these one or more sensors can be integrated in the MEMS driver circuit. Additionally, or alternatively, a given one of the one or more sensors can be separate from (i.e., external to) the MEMS driver circuit.

In some implementations, the MEMS driver circuit may obtain the sensor information based on the sensor information being automatically provided to the MEMS driver circuit. For example, the MEMS driver circuit may obtain sensor information from a given sensor when the given sensor is configured to automatically provide sensor information on a periodic basis, based on detection of a condition or event, based on measuring or determining a value that satisfies a threshold, and/or the like. Additionally, or alternatively, the MEMS driver circuit may obtain the sensor information based on requesting the sensor information.

In some implementations, the operation information can include information associated with modifying a manner in which the MEMS mirror is to operate. For example, the operation information can include information indicating that a range of angular operation of the MEMS mirror is to be modified. As a particular example, the operation information can include information indicating that a range of angular operation of the MEMS mirror is to be changed from a first range of angular operation (e.g., ±10° of tilt) to a second range of angular operation (e.g., ±15° of tilt). As another example, the operation information can include information indicating that an accuracy requirement, associated with the MEMS mirror, is to be modified (i.e., relaxed or tightened). As a particular example, the operation information can include information indicating that an accuracy requirement for detecting a zero crossing of the MEMS mirror (e.g., a point at which the MEMS mirror is at 0° of tilt) is to be relaxed from a first requirement (e.g., ±5 millidegrees) to a second requirement (e.g., ±10 millidegrees). The above described examples of types of operation information are non-limiting, and the MEMS driver circuit may obtain one or more other types of operation information, in some cases.

In some implementations, the MEMS driver circuit may obtain the operation information from one or more other components of the system, such as the system controller. In some implementations, the MEMS driver circuit may obtain the operation information based on the operation information being provided to the MEMS driver circuit. For example, the MEMS driver circuit may obtain operation information from the system controller when the system controller provides the operation information (e.g., after the system controller makes a determination that the operation of the MEMS mirror is to be modified). As another example, the MEMS driver circuit may obtain the operation information based on requesting the operation information (e.g., from the system controller).

As shown by reference number 110, the MEMS driver circuit (e.g., the adaptation component) may determine a state of the MEMS mirror based on the monitoring information (i.e., based on the sensor information and/or the operation information). The state of the MEMS mirror describes the particular set of operational conditions of the MEMS mirror at a given time. For example, the state of the MEMS mirror may identify whether the MEMS mirror is operating within an allowable temperature range, whether the MEMS mirror is experiencing an allowable amount of acceleration, whether the MEMS mirror is experiencing a threshold amount of shock and/or vibration, whether the MEMS mirror is operating in the presence of an allowable amount of EMI, an aging effect experienced by the MEMS mirror, whether a threshold electrical discharge has been detected from the MEMS mirror, whether a fault associated with the MEMS mirror has been detected, whether a manner in which the MEMS mirror is to operate is to be modified, and/or the like. Put generally, the state of the MEMS mirror describes the overall operational condition of the MEMS mirror as determined based on any sensor information and operation information obtained by the MEMS driver circuit.

In some implementations, the MEMS driver circuit may determine the state of the MEMS mirror based on the monitoring information. For example, the MEMS driver circuit may obtain a plurality of items of monitoring information (e.g., sensor information provided by one or more sensors and/or operation information provided by the system controller), and may determine, based on the plurality of items of monitoring information, the state of the MEMS mirror.

As shown by reference number 115, the MEMS driver circuit may adapt a mirror control parameter, associated with actuating the MEMS mirror, based on the state of the MEMS mirror. The mirror control parameter includes a parameter based on which the MEMS driver circuit is to actuate or control the MEMS mirror. The mirror control parameter may include, for example, a phase-locked loop (PLL) control parameter, an amplitude control parameter, an actuator voltage level control parameter, and/or the like. The above described examples of types of mirror control parameters are non-limiting, and the MEMS driver circuit may adapt one or more other types of mirror control parameters based on which the MEMS driver circuit actuates the MEMS mirror, in some cases.

In some implementations, the MEMS driver circuit may adapt the mirror control parameter based on the state of the MEMS mirror. For example, the state of the MEMS mirror may indicate that the MEMS mirror is experiencing shocks and/or vibrations. Here, the MEMS driver circuit may adapt the PLL control parameter by increasing proportional-integral-derivative (PID) gains of the PLL control parameter by a particular amount (e.g., in order to increase aggressiveness of the control loop).

As an additional example, the state of the mirror may indicate that an amount of acceleration at or near the MEMS mirror satisfies a threshold, and the MEMS driver circuit may adapt the PLL control parameter by increasing the PID gains of the PLL control parameter by a particular amount.

As another example, the state of the MEMS mirror may indicate that an amount of EMI at or near the MEMS mirror satisfies a threshold. In such a case, the MEMS driver circuit may adapt the PLL parameter by decreasing a proportional gain associated with the PLL control parameter by a particular amount.

As still another example, the state of the MEMS mirror may indicate that a range of angular operation of the MEMS mirror is to be widened (e.g., from ±10° to ±15°). Here, the MEMS driver circuit may adapt the amplitude control parameter such that comparatively higher proportional and incremental gains are used by the amplitude control parameter.

As yet another example, the state of the MEMS mirror may indicate that a range of angular operation of the MEMS mirror is to be reduced (e.g., from ±15° to ±10°). Here, the MEMS driver circuit may adapt the amplitude control parameter in order to get from a setpoint of 15° to the setpoint of 10°. In some implementations, control gains of the amplitude control parameter can be increased in order to move from to move from the 15° setpoint to the 10° setpoint at a comparatively faster speed, or can be decreased in order to mover from the 15° set point to the 10° setpoint at a comparatively slower speed.

As yet another example, the state of the MEMS mirror may indicate that an electrical discharge from the MEMS mirror has been detected. Here, the MEMS driver circuit may adapt the PLL control parameter and the amplitude control parameter such that no gains are used by these mirror control parameters for a particular amount of time.

As another example, the state of the MEMS mirror may indicate that a temperature at or near the MEMS mirror is higher than a threshold. Here, the MEMS driver circuit may adapt one or more mirror control parameters in order to begin using alternative control circuitry that carries out less computation and, thus, reduces power dissipation.

As an additional example, the state of the MEMS mirror may indicate that the MEMS mirror has experienced an aging effect. Here, depending on the nature of the aging effect, the MEMS driver circuit may adapt filters and/or gains, associated with one or more mirror control parameters, in order to compensate for the aging effect.

As yet another example, the state of the MEMS mirror may indicate that the MEMS mirror has experienced a fault (i.e., that a fault has been detected). Here, depending on the nature of the detected fault, the MEMS driver circuit may adapt one or more mirror control parameters in order to compensate for the fault (e.g., in order to provide degraded functionality, despite the fault).

As still another example, the state of the MEMS mirror may indicate that an accuracy requirement, associated with the MEMS mirror, is to be modified. Here, depending on the nature of the modification, the MEMS driver circuit may adapt one or more mirror control parameters in order to accommodate the modification (e.g., by increasing or decreasing control aggressiveness by adjusting PID gains).

As another example, the state of the MEMS mirror may indicate that a ripple has been detected in a current on the MEMS mirror. Here, the MEMS driver circuit may adapt the actuator voltage level control parameter in order to reduce or eliminate the ripple in the current on the MEMS mirror.

The above described examples are non-limiting, and the MEMS driver circuit may adapt one or more mirror control parameters based on the state of the MEMS mirror in additional and/or different manners than those described. Other examples of mirror control parameter adaptation include switching from adapting low pass filters associated with one or more mirror control parameters, switching from a first actuator voltage level to a second actuator voltage level, and/or the like.

As illustrated in the above examples, the MEMS driver circuit may adapt a single mirror control parameter based one or more conditions described by the state of the MEMS mirror. Alternatively, the MEMS driver circuit may adapt multiple mirror control parameters based on one or more conditions described by the state of the MEMS mirror.

In some implementations, the MEMS driver circuit may adapt the mirror control parameter based on identifying that influence counteraction is to be performed. For example, the MEMS driver circuit may determine that one or more conditions are present that cause an undesirable influence on the MEMS mirror (e.g., a value satisfying a threshold or being outside of an allowable range, a detection of an event, and/or the like) and, therefore, that the MEMS driver circuit is to counteract such influences. In such a case, the MEMS driver circuit may determine an influence condition based on the state of the MEMS mirror. The influence condition is a condition, described by the state information, that is to be prioritized by the MEMS driver circuit when adapting the one or more mirror control parameters.

In some implementations, identification of the influence condition may be useful when two or more conditions, identified by the state of the MEMS mirror, would result in conflicting mirror control parameter adaptations. For example, assume that the state of the MEMS mirror indicates that an amount of acceleration at or near the MEMS mirror satisfies a threshold (e.g., which indicates that the PLL control parameter is to be adapted by increasing PID gains of the PLL control parameter), and that an amount of EMI at or near the MEMS mirror satisfies a threshold (e.g., which indicates that the PLL control parameter is to be adapted by decreasing the PID gains of the PLL control parameter). Here, the MEMS driver circuit may identify either the acceleration condition or the EMI condition as the influence condition, and may proceed with adapting the PLL control parameter, accordingly. In some implementations, the MEMS driver circuit may identify the influence condition based on information stored or accessible by the MEMS driver circuit (e.g., information that identifies a priority level or score associated with different conditions, a model that receives information associated with the state of the MEMS mirror as an input and provides information that identifies one or more influence conditions as an output).

In some implementations, based on identifying the influence condition, the MEMS driver circuit may adapt the mirror control parameter in order to counteract (e.g., reduce or eliminate) the influence condition. In some implementations, when counteracting the influence condition, the MEMS driver circuit may select the mirror control parameter (e.g., from a plurality of mirror control parameters) based on the influence condition. In other words, the MEMS driver circuit may identify the mirror control parameter that, if adapted, would counteract any influences on the MEMS mirror caused by the influence. In some implementations, the MEMS driver circuit may determine a value for the mirror control parameter (e.g., a value to which the mirror control parameter is to be change), and may adapt the mirror control parameter accordingly. In some implementations, the MEMS driver circuit may adapt the mirror control parameter in order to obtain a least hazardous situation for the MEMS mirror (e.g., a safest possible operational state given the current state of the MEMS mirror).

As shown by reference number 120, the MEMS driver circuit may actuate the MEMS mirror based on the one or more adapted mirror control parameters. In other words, the MEMS driver circuit may cause the MEMS mirror to operate based on the adapted mirror control parameter. For example, the MEMS driver circuit may provide, to the MEMS mirror, a signal associated with the adapted mirror control parameter in order to cause the MEMS mirror to operate based on the adapted mirror control parameter (e.g., such that the MEMS mirror operates based on an adapted PLL control parameter, an adapted amplitude control parameter, an adapted actuator voltage level control parameter, and/or the like).

The above described steps can be repeated for further and/or additional adaption of one or more mirror control parameters. For example, the MEMS driver circuit may obtain additional monitoring information associated with the MEMS mirror (e.g., at a later time), and may determine an updated state of the MEMS mirror based on the additional monitoring information. Here, the MEMS driver circuit may further adapt the mirror control parameter (e.g., the same one or more mirror control parameters that were previously adapted) based on the updated state of the MEMS mirror. Additionally, or alternatively, the MEMS driver circuit may adapt one or more other mirror control parameters (e.g., one or more mirror control parameters other than those previously adapted) based on the updated state of the MEMS mirror.

In this way, the MEMS driver circuit may provide adaptive and context aware MEMS mirror control through the use of adaptable (i.e., dynamic) mirror control parameters. The adaptation of the mirror control parameters allows adverse and/or changing environmental conditions and/or operational conditions to be accounted for, thereby improving accuracy in terms of actuation of the MEMS mirror and position sensing of the MEMS mirror, which improves overall system accuracy and performance.

As indicated above, FIG. 1 is provided merely as an example. Other examples are possible and may differ from what was described with regard to FIG. 1.

Figure 2A:
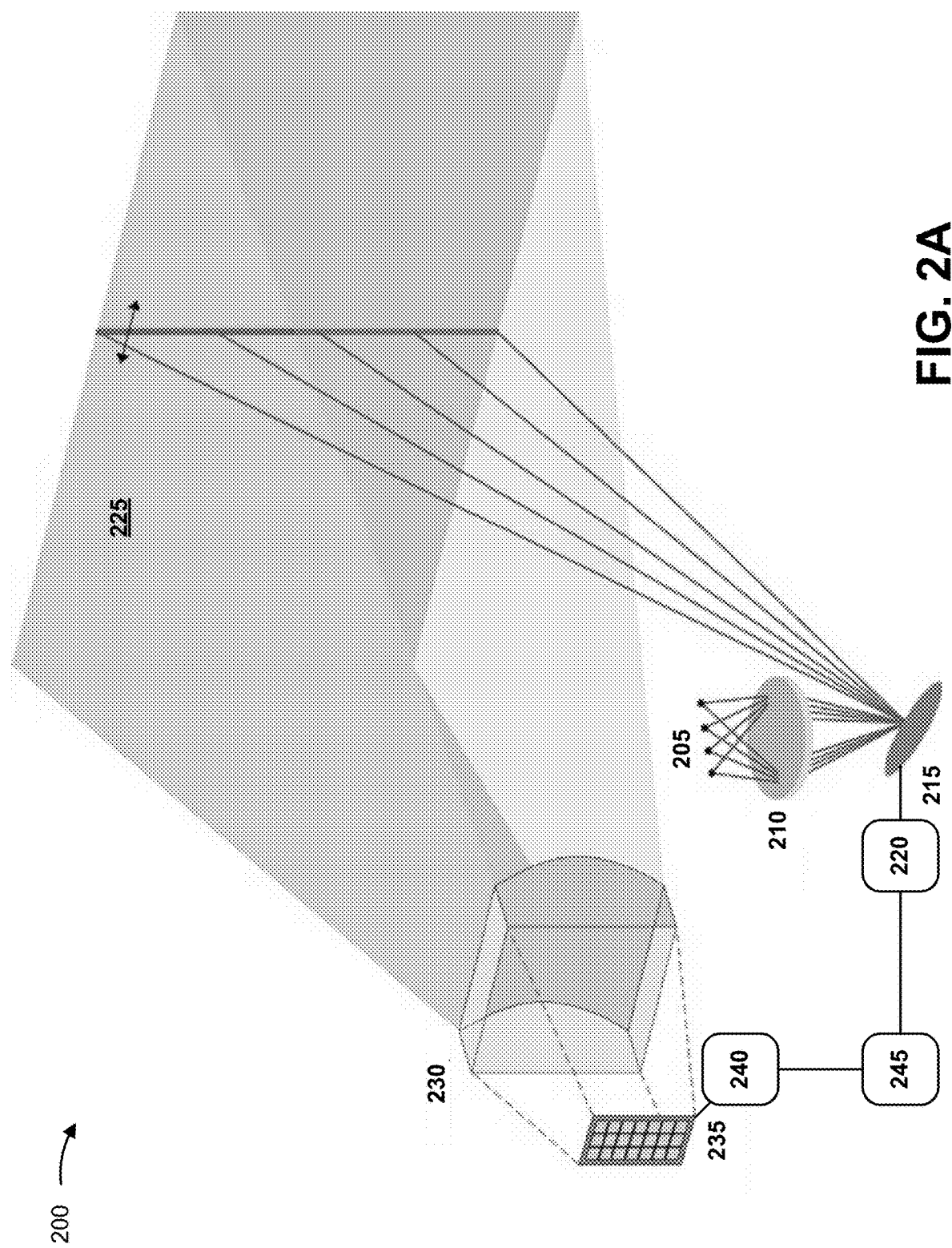
FIGS. 2A and 2B are diagrams associated with an example LiDAR system in which techniques and/or methods, described herein, may be implemented.
Figure 2B:
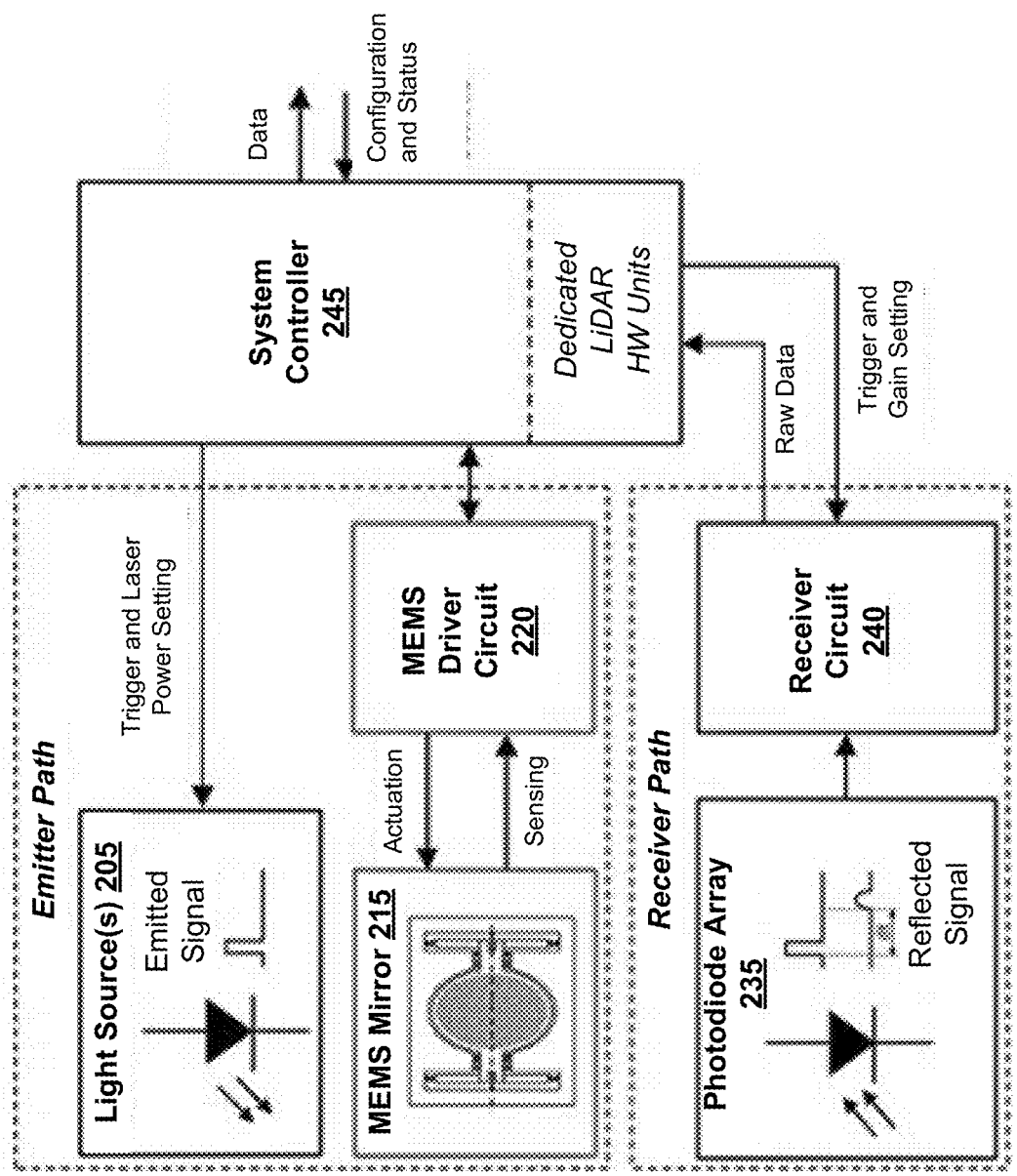

FIGS. 2A and 2B are diagrams associated with an example LiDAR system 200 in which techniques and/or methods, described herein, may be implemented. As shown in FIG. 2A, LiDAR system 200 may include an emitter path comprising one or more light sources 205, transmitter optics 210, a MEMS mirror 215 (e.g., a MEMS device comprising a reflective portion, a spring structure, a substrate, and/or the like), and a MEMS driver circuit 220 capable of communicating with a system controller 245.

In operation, as illustrated in FIG. 2A, the one or more light sources 205 (e.g., one or more lasers) each emit light, which is incident on transmitter optics 210. Transmitter optics 210 (e.g., one or more lenses) focuses and/or directs the light on MEMS mirror 215. Notably, light sources 205 and transmitter optics 210 may be designed and arranged such that light emitted by each light source 205 is incident on MEMS mirror 215 at a different angle (e.g., different vertical angles are illustrated in FIG. 2A). As a result, and as further shown in FIG. 2A, light from each light source 205 is directed by MEMS mirror 215 such that light from each light source 205 is incident on scenery 225 in a different section of scenery 225. For example, in FIG. 2A, light from each of four light sources 205 is incident on scenery 225 (in a vertical line) on a different vertical portion of scenery 225. In operation, MEMS mirror 215 may oscillate around an axis (e.g., such the light scans back and forth across scenery 225). As described herein, MEMS mirror 215 is actuated and controlled by MEMS driver circuit 220, which is capable of communicating with system controller 245 (e.g., a control device configured to control operation of LiDAR system 200).

As further shown in FIG. 2A, scenery 225 reflects light that is received on a receiver path of LiDAR system 200. As shown, the receiver path may include receiver optics 230, a photodiode array 235, and a receiver circuit 240 capable of communicating with system controller 245. In operation, light reflected by scenery 225 is received, via receiver optics 230 (e.g., one or more lenses), at photodiode array 235 (e.g., a one-dimensional array of photodiodes or a two-dimensional array of photodiodes). Photodiode array 235 then generates and provides (e.g., to system controller 245) one or more signals based on which distance measurement, 3D imaging, and/or the like, can be performed.

Another example diagram of LiDAR system 200 is provided in FIG. 2B. As shown in FIG. 2B, and as described herein, MEMS driver circuit 220 may be configured to actuate MEMS mirror 215 (e.g., based on providing actuation signals to MEMS mirror 215). As further shown, MEMS driver circuit 220 may be configured to sense a position of MEMS mirror 215 (e.g., based on receiving current sensing signals from MEMS mirror 215). As further shown, system controller 245 may be capable of triggering, configuring, and/or otherwise controlling light sources 205. As described above, accuracy of positional information provided by MEMS driver circuit 220 is important in order to ensure accurate triggering and/or configuration of light sources 205.

The number and arrangement of components shown in FIGS. 2A and 2B are provided as examples. In practice, there may be additional components, fewer components, different components, or differently arranged components than those shown in FIGS. 2A and 2B. Furthermore, two or more components shown in FIG. 2A or 2B may be implemented within a single component, or a single component shown in FIG. 2A or 2B may be implemented as multiple, distributed components. Additionally, or alternatively, a set of components (e.g., one or more components) shown in FIG. 2A or 2B may perform one or more functions described as being performed by another set of components.

Figure 3:
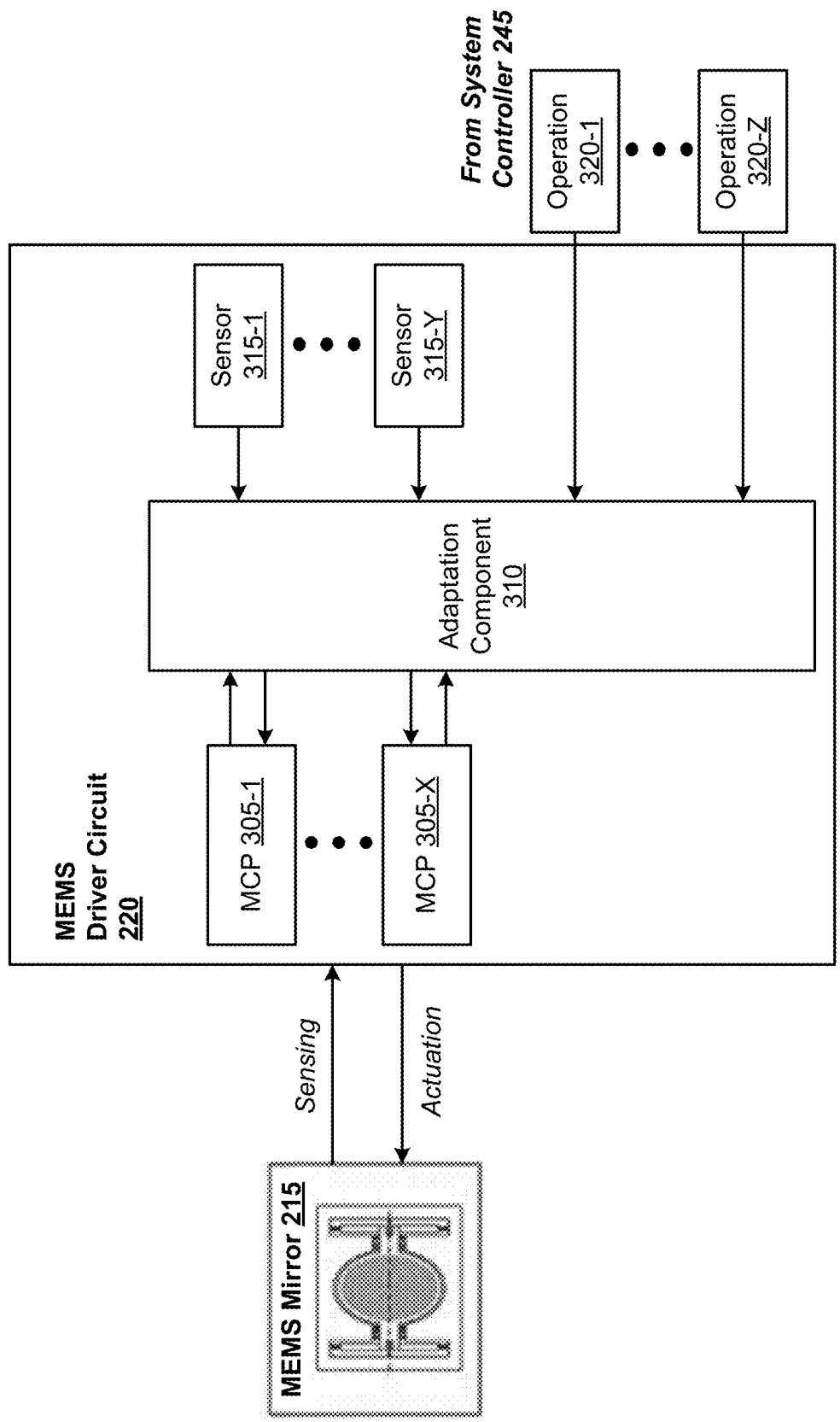
FIG. 3 is a diagram illustrating example components associated with a MEMS driver circuit described herein.

FIG. 3 is a diagram illustrating example components associated with MEMS driver circuit 220. As shown, MEMS driver circuit 220 may include one or more mirror control parameter components 305 (e.g., mirror control parameter components 305-1 through 305-X (X≥1)), an adaptation component 310, and one or more sensors 315 (e.g., sensors 315-1 through 315-Y (Y≥1)). As further shown, MEMS driver circuit 220 (e.g., adaptation component 310) may be capable of communicating with one or more operation components 320 (e.g., operation components 320-1 through 320-Z (Z≥1)).

Mirror control parameter component 305 includes a component associated with managing and applying one or more control parameters associated with actuating MEMS mirror 215. For example, mirror control parameter component 305 may include a component (e.g., one or more circuits) capable of managing and applying a PLL control parameter, a component capable of managing and applying an amplitude control parameter, a component capable of managing and applying an actuator voltage level control parameter, and/or the like. As shown in FIG. 3, mirror control parameter component 305 may be capable of communicating with adaptation component 310 (e.g., such that adaptation component 310 can adapt the one or more mirror control parameters to be managed and applied by mirror control parameter component 305).

Adaptation component 310 includes a component capable of adapting the one or more mirror control parameters to be managed and applied by mirror control parameter component 305, as described herein. In some implementations, adaptation component 310 may include a processing device (e.g., a microprocessor, a microcontroller, and/or the like) capable of obtaining monitoring information, determining a state of MEMS mirror 215 based on the monitoring information, and adapting one or more mirror control parameters based on the state of MEMS mirror 215, as described herein. As shown in FIG. 3, adaptation component 310 may be capable of communicating with mirror control parameter component 305. In some implementations, as indicated in FIG. 3, adaptation component may be capable of receiving information (e.g., sensor information) from sensor 315 and/or receiving information (e.g., operation information) from operation component 320.

Sensor 315 includes a component capable of components to sense and/or identify one or more conditions associated with the MEMS mirror, and providing sensor information to adaption component 310, as described herein. For example, sensor 315 may include a temperature sensor, an acceleration sensor, an EMI monitor, an aging effect monitor, an electrical discharge monitor, a fault monitor, a harmonics monitor, and/or another type of sensing and/or monitoring device. In some implementations, sensor 315 may be integrated in MEMS driver circuit 220 and/or may be external to MEMS driver circuit 220.

Operation component 320 includes a component capable of providing operation information to adaption component 310, as described herein. For example, operation component 320 may be a component capable of providing an indication that a range of angular operation is to modified, a component capable of providing information associated with changing an accuracy requirement associated with MEMS mirror 215, and/or the like. In some implementations, operation component 320 may be included in system controller 245.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components.

Figure 4:
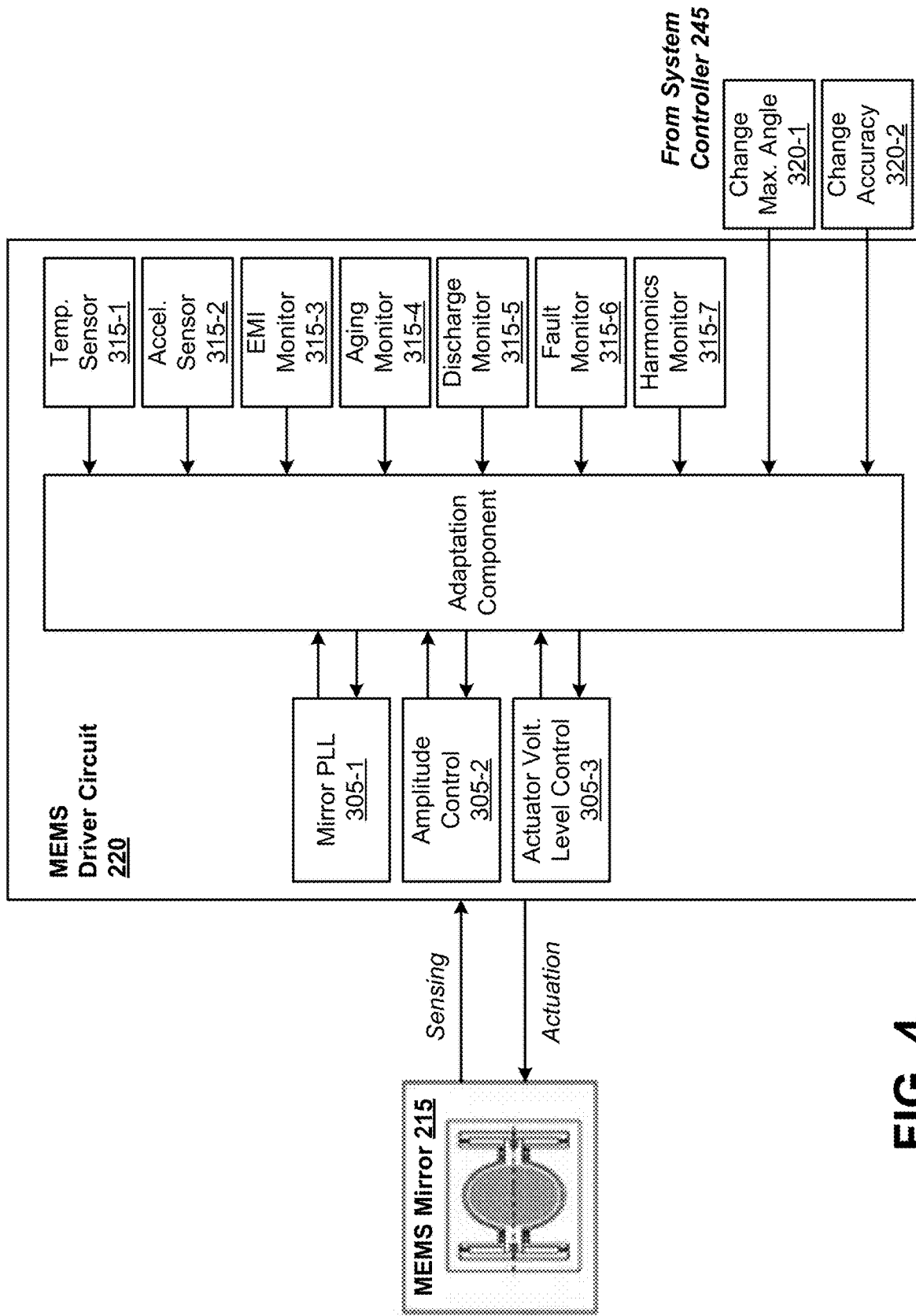
FIG. 4 is a diagram illustrating an example implementation of a MEMS driver circuit, as described herein.

FIG. 4 is a diagram illustrating an example associated with a possible implementation of MEMS driver circuit 220. As shown in FIG. 4, MEMS driver circuit 220 may include a mirror PLL component 305-1 associated with managing and applying a PLL control parameter, an amplitude control parameter 305-2 associated with managing and applying an amplitude control parameter, and an actuator voltage level control parameter 305-3 associated with managing and applying an actuator voltage level control parameter.

As further shown, MEMS driver circuit 220 may include a temperature sensor 315-1, an acceleration sensor 315-2, an EMI monitor 315-3, an aging effect monitor 315-4, an electrical discharge monitor 315-5, a fault monitor 315-6, and a harmonics monitor 315-7. As described above, these sensors 315 may provide sensor information to adaption component 310.

As further shown, MEMS driver circuit 220 may be configured to communicate with a maximum angle change component 320-1 (e.g., an operation component 320 configured to provide an indication that a range of angular operation is to modified) and an accuracy change component 320-2 (e.g., an operation component 320 configured to provide information associated with changing an accuracy requirement associated with MEMS mirror 215). As described above, these operation components 320 may provide operation information to adaptation component 310.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components.

FIG. 5 is a flow chart of an example process for adapting a mirror control parameter, associated with a MEMS mirror, based on a state of the MEMS mirror, as described herein. In some implementations, one or more process blocks of FIG. 5 may be performed by MEMS driver circuit 220. In some implementations, one or more process blocks of FIG. 5 may be performed by another device or a group of devices separate from or including MEMS driver circuit 220, such as MEMS mirror 215 or system controller 245.

As shown in FIG. 5, process 500 may include obtaining a plurality of items of monitoring information associated with a MEMS mirror (block 510). For example, MEMS driver circuit 220 may obtain a plurality of items of monitoring information associated with MEMS mirror 215, as described above. In some implementations, MEMS driver circuit 220 may be configured to control operation of MEMS mirror 215, as described above. In some implementations, the plurality of items of monitoring information may include sensor information provided by one or more sensors associated with MEMS mirror 215, or operation information provided by system controller 245, as described above.

As further shown in FIG. 5, process 500 may include determining, based on the plurality of items of monitoring information, a state of the MEMS mirror (block 520). For example, MEMS driver circuit 220 may determine, based on the plurality of items of monitoring information, a state of MEMS mirror 215, as described above.

As further shown in FIG. 5, process 500 may include adapting, based on the state of the MEMS mirror, a mirror control parameter based on which the MEMS driver circuit is to actuate the MEMS mirror (block 530). For example, MEMS driver circuit 220 may adapt, based on the state of the MEMS mirror, a mirror control parameter based on which MEMS driver circuit 220 is to actuate MEMS mirror 215, as described above.

Process 500 may include additional implementations, such as any single implementation or any combination of implementations described below and/or in connection with one or more other processes described elsewhere herein.

In some implementations, MEMS driver circuit 220 may cause MEMS mirror 215 to operate based on the adapted mirror control parameter.

In some implementations, MEMS driver circuit 220 and MEMS mirror 215 may be included in a LiDAR system in which MEMS driver circuit 220 is to control a tilt of MEMS mirror 215 in association with directing light associated with the LiDAR system.

In some implementations, the sensor information may include information associated with at least one of: a temperature at or near MEMS mirror 215; an amount of acceleration at or near MEMS mirror 215; an amount of electromagnetic interference (EMI) at or near MEMS mirror 215; an amount of pressure at or near MEMS mirror 215; a vibration or a shock experienced by MEMS mirror 215; a current associated with driving MEMS mirror 215 or obtaining a position condition of MEMS mirror 215; an aging effect experienced by MEMS mirror 215; an electrical discharge in MEMS mirror 215; a detection of a fault associated with MEMS mirror 215; or a presence of harmonics in MEMS mirror 215.

In some implementations, the operation information may include information associated with at least one of: a request to modify a range of angular operation of MEMS mirror 215; a request to modify an accuracy requirement associated with MEMS mirror 215 a request to modify a resolution requirement associated with a Lidar System using the MEMS mirror 215.

In some implementations, the mirror control parameter may include at least one of: a phase-locked loop (PLL) control parameter associated with MEMS mirror 215; an amplitude control parameter associated with MEMS mirror 215; or an actuator voltage level control parameter associated with MEMS mirror 215.

In some implementations, the plurality of items of monitoring information is a first plurality of items of monitoring information, the state is a first state, and the mirror control parameter is a first mirror control parameter. Here, MEMS driver circuit 220 may obtain a second plurality of items of monitoring information associated with MEMS mirror 215; determine a second state of MEMS mirror 215 based on the second plurality of items of monitoring information; and adapt a second mirror control parameter, associated with controlling MEMS mirror 215, based on the second state of MEMS mirror 215, wherein the second mirror control parameter is different from the first mirror control parameter. In some implementations, the second plurality of items of monitoring information is obtained at a different time than the first plurality of items of monitoring information.

In some implementations, the plurality of items of monitoring information is a first plurality of items of monitoring information and the state is a first state. Here, MEMS driver circuit 220 may obtain a second plurality of items of monitoring information associated with MEMS mirror 215; determine a second state of MEMS mirror 215 based on the second plurality of items of monitoring information; and further adapt the mirror control parameter based on the second state. In some implementations, the second plurality of items of monitoring information is obtained at a different time than the first plurality of items of monitoring information.

In some implementations, MEMS driver circuit 220 may identify, based on the state of MEMS mirror 215, that influence counteracting is to be performed; and determine an influence condition based on the state of MEMS mirror 215. Here, when adapting the mirror control parameter, MEMS driver circuit 220 may counteract influences on MEMS mirror 215 based on the determined influence condition. In some implementations, when counteracting the influences on MEMS mirror 215, MEMS driver circuit 220 may select the mirror control parameter from a plurality of mirror control parameters; and determine a value for the mirror control parameter to obtain a least hazardous situation for MEMS mirror 215.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
a micro-electro-mechanical systems (MEMS) mirror; and
a MEMS driver circuit to:
obtain a plurality of items of monitoring information associated with the MEMS mirror,
wherein the plurality of items of monitoring information includes at least one of:
sensor information received from one or more sensors associated with the MEMS mirror, or
operation information received from a controller associated with the system;
determine a state of the MEMS mirror based on two or more of the plurality of items of monitoring information being processed in parallel; and
adapt a mirror control parameter, associated with controlling the MEMS mirror, based on the state of the MEMS mirror.

2. The system of claim 1, wherein the MEMS driver circuit is further to:
cause the MEMS mirror to operate based on the adapted mirror control parameter.

3. The system of claim 1, wherein the system is a LiDAR system in which the MEMS driver circuit is to control a tilt of the MEMS mirror in association with directing light associated with the LiDAR system.

4. The system of claim 1, wherein the sensor information includes information associated with at least one of:
a temperature at or near the MEMS mirror;
an amount of acceleration at or near the MEMS mirror;
an amount of electromagnetic interference (EMI) at or near the MEMS mirror;
an amount of pressure at or near the MEMS mirror;
a vibration or a shock experienced by the MEMS mirror;
a current associated with driving the MEMS mirror or obtaining a position condition of the MEMS mirror;
an aging effect experienced by the MEMS mirror;
an electrical discharge in the MEMS mirror;
a detection of a fault associated with the MEMS mirror; or
a presence of harmonics in the MEMS mirror.

5. The system of claim 1, wherein the operation information includes information associated with at least one of:
a request to modify a range of angular operation of the MEMS mirror; or
a request to modify an accuracy requirement associated with the MEMS mirror.

6. The system of claim 1, wherein the mirror control parameter includes at least one of:
a phase-locked loop (PLL) control parameter associated with the MEMS mirror;
an amplitude control parameter associated with the MEMS mirror; or
an actuator voltage level control parameter associated with the MEMS mirror.

7. The system of claim 1, wherein the plurality of items of monitoring information is a first plurality of items of monitoring information, the state is a first state, and the mirror control parameter is a first mirror control parameter, and
wherein the MEMS driver circuit is further to:
obtain a second plurality of items of monitoring information associated with the MEMS mirror;
determine a second state of the MEMS mirror based on the second plurality of items of monitoring information; and adapt a second mirror control parameter based on the second state of the MEMS mirror,
wherein the second mirror control parameter is different from the first mirror control parameter.

8. The system of claim 7, wherein the second plurality of items of monitoring information is obtained at a different time than the first plurality of items of monitoring information.

9. The system of claim 1, wherein the plurality of items of monitoring information is a first plurality of items of monitoring information and the state is a first state, and
wherein the MEMS driver circuit is further to:
obtain a second plurality of items of monitoring information associated with the MEMS mirror;
determine a second state of the MEMS mirror based on the second plurality of items of monitoring information; and
further adapt the mirror control parameter based on the second state of the MEMS mirror.

10. The system of claim 1, wherein the MEMS driver circuit is further to:
identify, based on the state of the MEMS mirror that influence counteracting is to be performed; and
determine an influence condition based on the state of the MEMS mirror; and
wherein, when adapting the mirror control parameter, the MEMS driver circuit is to:
counteract influences on the MEMS mirror based on the determined influence condition.

11. The system of claim 10, wherein when counteracting the influences on the MEMS mirror, the MEMS driver circuit is to:
select the mirror control parameter, from a plurality of mirror control parameters, based on the influence condition; and
determine a value for the mirror control parameter in order to obtain a least hazardous situation for the MEMS mirror.

12. A method, comprising:
obtaining, by a micro-electro-mechanical systems (MEMS) driver circuit, a plurality of items of monitoring information associated with a MEMS mirror,
wherein the MEMS driver circuit is to control operation of the MEMS mirror, and
wherein the plurality of items of monitoring information includes:
sensor information provided by one or more sensors associated with the MEMS mirror, or
operation information provided by a controller associated with a system;
determining, by the MEMS driver circuit and based on two or more of the plurality of items of monitoring information being processed in parallel, a state of the MEMS mirror; and
adapting, by the MEMS driver circuit and based on the state of the MEMS mirror, a mirror control parameter based on which the MEMS driver circuit is to actuate the MEMS mirror.

13. The method of claim 12, further comprising:
actuating the MEMS mirror based on the adapted mirror control parameter.

14. The method of claim 12, wherein the MEMS driver circuit and the MEMS mirror are included in a LiDAR system.

15. The method of claim 12, wherein the sensor information includes information associated with at least one of:
a temperature at or near the MEMS mirror;
an amount of acceleration at or near the MEMS mirror;
an amount of electromagnetic interference (EMI) at or near the MEMS mirror;
an amount of pressure at or near the MEMS mirror;
a vibration or a shock experienced by the MEMS mirror;
a current associated with driving the MEMS mirror or obtaining a position condition of the MEMS mirror;
an aging effect experienced by the MEMS mirror;
an electrical discharge in the MEMS mirror;
a detection of a fault associated with the MEMS mirror; or
a presence of harmonics in the MEMS mirror.

16. The method of claim 12, wherein the operation information includes information associated with at least one of:
a request to modify a range of angular operation of the MEMS mirror; or
a request to modify an accuracy requirement associated with the MEMS mirror.

17. The method of claim 12, wherein the mirror control parameter includes at least one of:
a phase-locked loop (PLL) control parameter associated with the MEMS mirror;
an amplitude control parameter associated with the MEMS mirror; or
an actuator voltage level control parameter associated with the MEMS mirror.

18. The method of claim 12, wherein the plurality of items of monitoring information is a first plurality of items of monitoring information, the state is a first state, and the mirror control parameter is a first mirror control parameter, and
wherein the method further comprises:
obtaining a second plurality of items of monitoring information associated with the MEMS mirror;
determining a second state of the MEMS mirror based on the second plurality of items of monitoring information; and
adapting a second mirror control parameter, associated with controlling the MEMS mirror, based on the second state,
wherein the second mirror control parameter is different from the first mirror control parameter.

19. The method of claim 12, wherein the plurality of items of monitoring information is a first plurality of items of monitoring information and the state is a first state, and
wherein the method further comprises:
obtaining a second plurality of items of monitoring information associated with the MEMS mirror;
determining a second state of the MEMS mirror based on the second plurality of items of monitoring information; and
further adapting the mirror control parameter based on the second state of the MEMS mirror.

20. A LiDAR system, comprising:
a micro-electro-mechanical systems (MEMS) mirror; and
a MEMS driver circuit to:
obtain a plurality of items of monitoring information, associated with the MEMS mirror, that includes:
sensor information provided by one or more sensors associated with the MEMS mirror, or
operation information provided by a controller associated with the LiDAR system;
determine a state of the MEMS mirror based on two or more of the plurality of items of monitoring information being processed in parallel;

adapt a mirror control parameter, associated with the MEMS mirror, based on the state of the MEMS mirror; and
control the MEMS mirror based on the adapted mirror control parameter.

* * * * *